United States Patent
Fettweis et al.

(10) Patent No.: US 8,929,352 B2
(45) Date of Patent: Jan. 6, 2015

(54) METHOD AND APPARATUS FOR MULTI-CARRIER FREQUENCY DIVISION MULTIPLEXING TRANSMISSION

(76) Inventors: Gerhard Fettweis, Dresden (DE); Marco Krondorf, Dresden (DE); Steffen Bittner, Altenberg (DE)

(*) Notice: Subject to any disclaimer, the term of this patent is extended or adjusted under 35 U.S.C. 154(b) by 698 days.

(21) Appl. No.: 12/640,428

(22) Filed: Dec. 17, 2009

(65) Prior Publication Data

US 2010/0189132 A1 Jul. 29, 2010

(30) Foreign Application Priority Data

Dec. 18, 2008 (EP) .................. 08022010

(51) Int. Cl.
*H04B 7/208* (2006.01)
*H04L 27/26* (2006.01)
*H04L 5/00* (2006.01)
*H04L 5/06* (2006.01)

(52) U.S. Cl.
CPC ............ *H04L 27/2637* (2013.01); *H04L 5/003* (2013.01); *H04L 5/06* (2013.01); *H04L 27/2607* (2013.01); *H04L 27/2653* (2013.01); *H04L 27/2614* (2013.01)
USPC .......................................... 370/344; 370/481

(58) Field of Classification Search
USPC ................................................ 370/344, 481
See application file for complete search history.

(56) References Cited

U.S. PATENT DOCUMENTS

| | | | | |
|---|---|---|---|---|
| 2005/0286619 | A1* | 12/2005 | Haddadin et al. | 375/222 |
| 2006/0031274 | A1* | 2/2006 | Haddadin et al. | 708/300 |
| 2006/0039273 | A1* | 2/2006 | Gore et al. | 370/208 |
| 2009/0316647 | A1* | 12/2009 | Chen et al. | 370/330 |
| 2010/0098182 | A1* | 4/2010 | Forck et al. | 375/261 |
| 2010/0173586 | A1* | 7/2010 | McHenry et al. | 455/62 |
| 2010/0189092 | A1* | 7/2010 | Seki | 370/344 |
| 2010/0322226 | A1* | 12/2010 | McCoy | 370/344 |
| 2010/0329229 | A1* | 12/2010 | Lipka et al. | 370/344 |

OTHER PUBLICATIONS

Ma, Howard H., Jack, Wolf K., "On Tail Biting Convolutional Codes", Feb. 1986, IEEE Transactions on Communications, vol. COM-34, No. 2, pp. 104-111.*

* cited by examiner

*Primary Examiner* — Jason Mattis
(74) *Attorney, Agent, or Firm* — Edwards Wildman Palmer LLP; Peter F. Corless; Steven M. Jensen (57) ABSTRACT

A general frequency division multiplex (GFDM) transmission system is proposed. Vacant frequency ranges are detected and subsequently used for transmission, wherein a single carrier transmission system with cyclic prefixing is deployed. A corresponding transmitter and receiver are disclosed.

6 Claims, 6 Drawing Sheets

Fig. 6

METHOD AND APPARATUS FOR MULTI-CARRIER FREQUENCY DIVISION MULTIPLEXING TRANSMISSION

CROSS-REFERENCES TO RELATED APPLICATIONS

This application claims under 35 U.S.C. §119(a) the benefit of European Patent Application No. 08022010.6 filed Dec. 18, 2009 the entire contents of which is incorporated herein by reference.

The present invention relates to a method for data transmission employing a frequency division multiplexing technique and a corresponding apparatus for multi-carrier frequency division multiplexing transmission.

The exponential growth of communication traffic of the recent years that calls for an optimized utilization of the radio frequency spectrum has drawn scientific and industrial attention on a search for agile mechanisms that may use "holes" or "white spaces", i.e. vacant frequency bands, in the radio spectrum for radio transmission.

A major technical challenge in exploiting white spaces in the radio spectrum, e.g. in the TV UHF bands, which are located in close proximity to allocated spectrums is the fragmentation of the spectrum. Typically, TV white spaces (TVWSs) are not consecutively placed in the spectrum; rather, the UHF TV spectrum exhibits a strong spectrum fragmentation. In order to efficiently exploit all detected TV white spaces, a system is required which can cope with strong spectrum fragmentation and which is able to perform aggregation of several TVWS by one single wideband signal. Another example for a radio spectrum that may exhibit unused spaces is in low power sensor networks. The design of a transceiver architecture and concept, allowing to opportunistically exploit white spaces of allocated radio frequency bands for wireless data communications is particularly difficult, mainly for two reasons. On the one hand, signal generation should ensure ultra-low out-off-band radiation to strictly avoid harmful interference to legacy TV signals. On the other hand, the receivers and/or transmitters should exhibit high sensitivity in order to explore white spaces, i.e., to sense even very weak radio signals in allocated frequency bands.

Recent studies indicate the usage of multi-carrier systems to flexibly exploit spectrum vacancies by switching sub-carriers on and off. However, the proposed multi-carrier system OFDM (Orthogonal Frequency Division Multiplexing) is known to cause strong spectral leakage even when using pulse shaping techniques or guard carriers.

What is needed in the art, therefore, is a transmission scheme that combines the flexibility and simplicity of OFDM with stronger interference reduction mechanisms.

According to the invention there is provided a method for data transmission by frequency division multiplexing (FDM) according to claim 1. The invention further provides a corresponding transmitter arrangement and a receiver arrangement.

The inventive approach exhibits some attractive features which are of particular importance for scenarios exhibiting high degrees of spectrum fragmentation. Specifically, the generalized digital multi-carrier transmitter concept according to the invention provides a lower peak-to-average power ratio (PAPR) compared to OFDM, a ultra-low out-of-band radiation due to adjustable Tx-filtering, and last but not least a block-based transmission using cyclic prefix insertion and efficient FFT-based equalization. The novel transmission concept of the invention enables frequency and time domain multi-user scheduling comparable to OFDM and provides an efficient alternative for white space aggregation even in heavily fragmented spectrum regions. Unlike in OFDM, the FDM carriers are no longer necessarily orthogonal to each other. Below, the novel transmission concept will also be referred to as Generalized Frequency Division Multiplexing (GFDM).

Additional features and advantages of the present invention will be apparent from the following detailed description of specific embodiments which are given by way of example and in which reference will be made to the accompanying drawings, wherein.

DETAILED DESCRIPTION OF THE INVENTION

Figure 1:
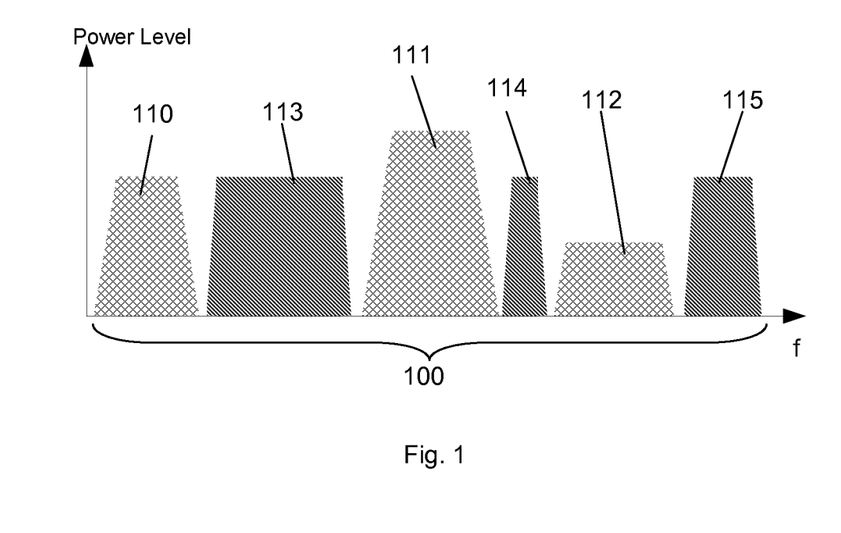
FIG. 1 shows, a fragmented TV UHV frequency spectrum with white spaces as an example for frequency ranges that may be used for transmission according to the concept of the invention.

FIG. 1 illustrates a frequency range 100, which in one embodiment may be the UHF frequency range traditionally used for the transmission of television signals 110-112. These TV signals may occupy an individual bandwidth and may be of individual signal power as indicated by the height of the signal blocks. As illustrated, the TV signals 110-112 are not bordering each other, thus leaving vacant frequency ranges 113-115 between the TV signals. These vacant frequency ranges 113-115 are also called TV white spaces (TVWS) in the following.

TV white spaces 113-115 may be used for the transmission of arbitrary signals, wherein the arbitrary signals must not interfere with adjacent signals, i.e. the arbitrary signals transmitted in the TV white spaces must not leak into adjacent frequency bands used for other, e.g. TV, signals. Accordingly the signals transmitted must exhibit a low out-off-band radiation to avoid harmful interference to legacy signals of adjacent frequency bands.

For finding vacant frequency bands, which could be used for subsequent signal transmission, the transmitter or the receiver or both may scan potential frequency ranges. Vacant frequency ranges can be detected for example by investigating the energy transmitted on a frequency. Note that the transmitter and/or receiver scans the potential frequency ranges very carefully in order to detect even weak signals and in order to prevent any interference with detected signals.

Once vacant frequency ranges are detected, the transmitter or the receiver determines the vacant frequency ranges to be used for subsequent transmission. In one embodiment the transmitter and the receiver both may scan potential frequency ranges and may then coordinate the search for vacant frequencies to ensure that frequencies are used, which have been detected as vacant by both the transmitter and the sender.

Once a vacant frequency has been determined, the bandwidth and the center frequency of frequency range are determined by either the transmitter or the receiver or in cooperation. Since a single carrier transmission method will be used, the center frequency of the determined vacant frequency range determines the carrier frequency and the bandwidth limits the baud rate of the transmission.

In one embodiment the receiver informs the transmitter about possible center frequencies and available bandwidths. On the other hand the transmitter informs the receiver about details for the following signal transmission accordingly. That is, the transmitter informs the receiver about all the details necessary for transmitting data, i.e. the modulation type, the baud rate, coding mode etc. to be used for the following transmission. Accordingly an established communication channel between the transmitter and the receiver is assumed, which can be used for transmitting the determined detail information of the subsequent transmission from the receiver to the transmitter and back. Said established communication channel in one embodiment may be a signaling channel for distributing information to a plurality of receivers.

The transmission using the detected vacant frequency range stops if at least one of the following criteria is matched. In one embodiment, the transmitter may listen on the used frequency range for unexpected signals, which indicate that there is another transmitter using the frequency range. For this purpose the transmitter may comprise corresponding means for listening. The transmitter may inform the receiver correspondingly about the detected interference using above mentioned established communication channel. Alternatively, the transmitter may stop the transmission on the detected frequency range, if the receiver indicates that it cannot receive, i.e. decode, the transmitted signals successfully, which may due to interfering signals at the receiver. The receiver may indicate to stop the transmission of signals on the vacant frequency range for example directly by a signal sent on the above mentioned established communication channel or by not sending an acknowledge message in the vacant frequency range.

Figure 2:
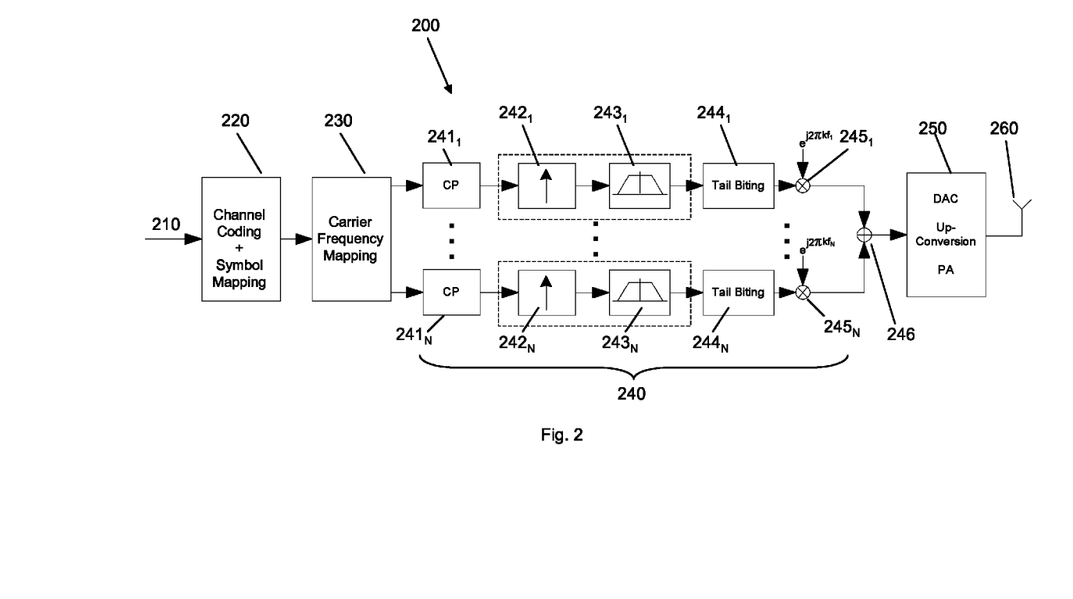
FIG. 2 shows a schematic block diagram of a preferred digital transmitter according to the invention.

FIG. 2 shows a schematic block diagram of an embodiment of a digital transmitter 200 capable of transmitting an incoming stream 210 of information bits using at least one or a plurality of detected TV white spaces simultaneously.

Processing block 220 performs channel encoding on the incoming stream of information thus producing a stream of channel encoded bits. The channel encoding may comprise, for example, the removal of redundant information or may comprise the addition of error correcting information, for example a cyclic redundancy check (CRC) code. The stream of encoded bits is then mapped to transmit symbols, thus producing a stream of transmit symbols representing the stream of channel encoded information bits, wherein said symbols may be QAM or alternatively QPSK symbols.

The stream of transmit symbols is passed to processing block 230, which maps the symbols to at least one or a plurality of N carrier frequencies, wherein the n carrier frequencies are center frequencies of vacant frequency bands. In transmitter 200 a plurality of n of the N parallel processing branches is used, wherein n corresponds to the number of detected vacant frequencies. Each of the symbols is then passed to one of a plurality of N parallel processing branches 240. Since each of the branches comprises the same processing blocks, the following description relates to all branches.

Each branch comprises a processing block $241_n$ for adding a cyclic prefix (CP) to each symbol, an up-sampling block $242_n$ and a digital filter $243_n$ for pulse shaping each symbol, processing block $244_n$ for performing a tail-biting technique and a complex multiplier $245_n$ for digitally frequency shifting a symbol relative to the at least one other carrier frequency of another used parallel branch.

Every carrier is modulated individually, using some arbitrary form of modulation. In the following the QAM symbol stream on carrier n is denoted as s(n,k), where k represents the symbol index. After upsampling in block 230, the symbol's index now turns into the sample index k', representing the sample duration $T_S$.

Subsequently, cyclic prefix (CP) insertion is performed, accounting for the filter length of the digital pulse shaping, the filter length of the digital receive filter and the length of the mobile channel impulse response. The insertion of cyclic prefixes is used to allow for low complex equalization at the receiver side. After cyclic prefix insertion, digital pulse shaping is performed in blocks $242_n$, $243_n$ carrier-wise, wherein each symbol is up-sampled in block $242_n$ and each up-sampled symbol s(n,k') of the n-th carrier is convoluted with the transmit filter function of the n-th branch $g_{Tx}(n,k')$:

$$s(n,k')*g_{Tx}(n,k') \qquad (1)$$

This pulse shaping is crucial for low out-off-band radiation, the digital filters correspondingly exhibiting sharp filter edges, which in turn necessitate high transmit (Tx) filter orders. Large filter orders are generally problematic due to the cyclic prefix, which has to be matched to the aggregate filter lengths of all system filters involved. However, at least for the digital Tx-filter, the principle of tail-biting as originally introduced by H. Ma and J. Wolf in "*On Tail Biting Convolutional Codes*"; IEEE Transactions on Communications, Vol. 34, Issue 2, February 1986, for convolutional codes, can be optionally applied in order to reduce the CP overhead as depicted in FIG. 3 and explicated below.

After individual pulse shaping, each carrier n is digitally frequency shifted to its relative carrier frequency $f_n$ by a complex multiplier $245_n$, which is normalized to the signal bandwidth $B=1/T_S$, i.e. the symbols are frequency shifted relative to each other. Note that this relative frequency shift is maintained when subsequently mixing the signal to a carrier frequency in the analog processing stage. A signal produced by one branch is hence defined in the interval $[-\frac{1}{2}:\frac{1}{2}]$ centered around the carrier frequency. The resulting time domain signal x(k') hence becomes $$x(k') = \sum_n (s(n,k')*g_{Tx}(n,k'))e^{j2\pi k' f_n}. \qquad (2)$$

The digital time domain signals of all used branches are then combined by a complex adder 246 to form a single digital signal representing the combination of all digital time domain signals, which is passed to block 250.

Finally, in block 250 each time domain signal x(k') is digital-to-analogue converted, mixed to the carrier frequency and amplified to form one transmit signal. In case of using at least two parallel branches 240, i.e. two carrier frequencies shifted digitally relative to each other as mentioned above, the resulting single transmit signal is a wideband transmit signal. Said wideband transmit signal is transmitted via antenna 260.

Note that the used carriers may not be orthogonal to each other. Rather, each carrier is modulated individually thus forming a single carrier transmission using cyclic prefixing. Accordingly, i.e. if at least two or more vacant frequency ranges are detected and used, the wideband signal as transmitted by antenna 260 comprises a plurality of single carrier signals each using cyclic prefixing.

It is well known that OFDM uses a cyclic prefix (CP) to simplify signal equalization but on the other side exhibits a high peak-to-average power ratio (PAPR) as one major drawback. A lower PAPR and simple equalization is achieved when using a cyclic prefix in conventional single carrier systems, leading to the SC-CP (single carrier with cyclic prefix) system concept. Hence, from the above given GFDM signal generation scheme the proposed frequency division multiplexing concept may be interpreted as a system of parallel single-carrier cyclic-prefixed signals (SC-CPs) realized in the digital domain.

The resulting transmit signal exhibits the following properties. Each carrier represents an independent SC-CP link, which can be modulated individually having an own bandwidth and pulse shaping. In contrast to well known OFDM systems, the frequency division multiplexed (FDM) carriers are not orthogonal but exhibit mutual interference which can be adjusted by the individual transmit (Tx) filters and signal bandwidths.

Due to the digital implementation of the signal processing in the parallel branches, the GFDM concept combines the advantages of the simple equalization with the ability of flexible allocation of white spaces, i.e. vacant frequency bands, and controllable out-off-band radiation. Furthermore the transmitter architecture allows an easy equalization despite the wideband nature of the transmit signal, a frequency agile white space allocation and flexible signal bandwidth. Due to the digital implementation of each branch 240, the requirements of the analogue front-end are reduced.

FIGS. 3A to 3D schematically depict the tail-biting technique for a digital transmit signal 300 as deployed in processing block 244, of FIG. 2. Transmit signal 300 consists of payload samples, i.e. portion 310, and samples of a cyclic prefix 320, wherein conventional cyclic prefix samples are the last samples of the payload copied to the beginning of the signal to produce a symmetric signal. The length of cyclic prefix is determined by the properties of the transmit filter, the transmit channel and the receive filter as schematically indicated by portions 330-350.

Figure 3A:
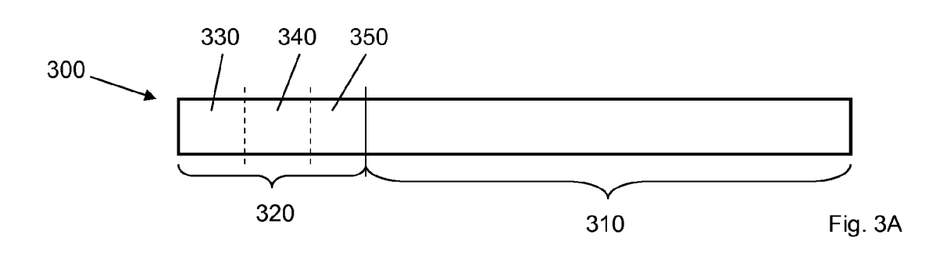
FIG. 3 illustrates the principle of CP shortening by tail biting.
Figure 3B:
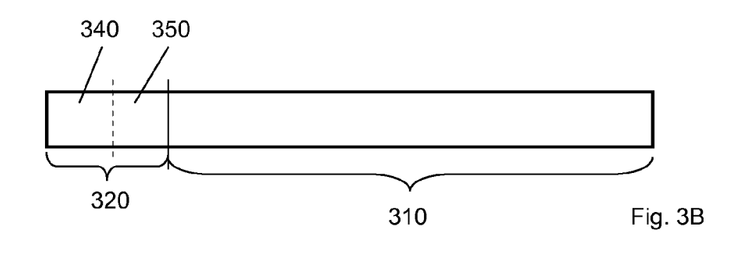

In contrast to a signal comprising a conventional cyclic prefix 320 as depicted in FIG. 3A, the first portion 330 reflecting the length of the transmit (Tx) filter is neglected, thus shortening the length of the cyclic prefix as depicted in FIG. 3B.

Figure 3C:
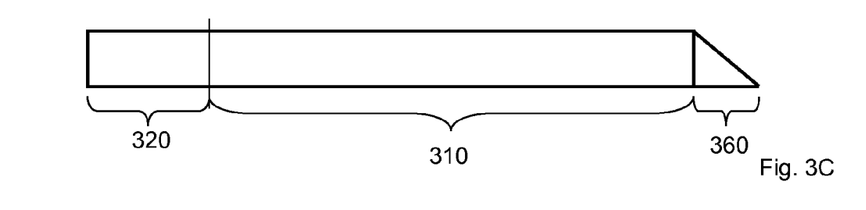
Figure 3D:
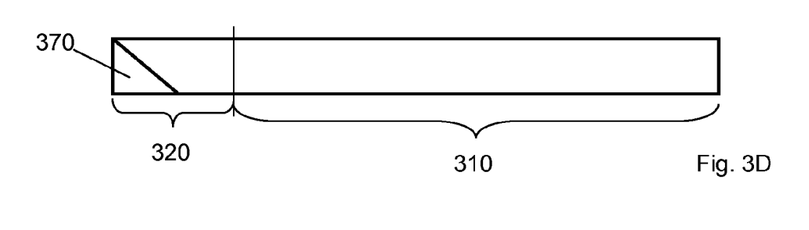

FIG. 3C depicts the signal after having passed the transmit filter processing block 243$_n$, which appends some digital samples 350 to the signal.

The samples 360 appended by the transmit filter processing are cut off and superimposed to the first samples of the shortened cyclic prefix 320, thus emulating a circular convolution to assimilate the beginning of the signal block to its end.

Figure 4:
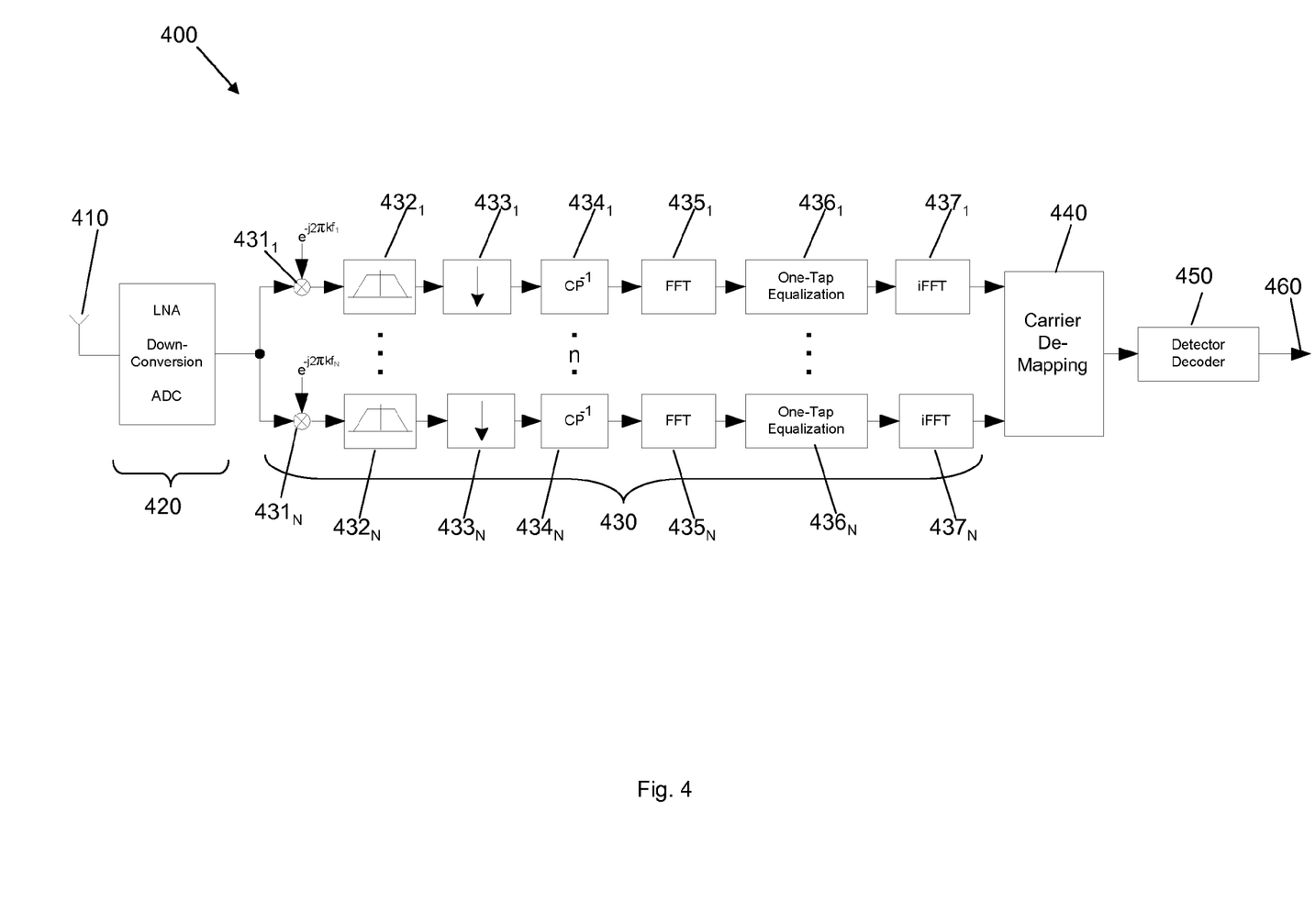
FIG. 4 shows a schematic block diagram of a preferred digital receiver for utilization in conjunction with the GFDM concept.

FIG. 4 depicts a preferred embodiment of a receiver 400 according to the concept of the invention, which performs parallel single-carrier cyclic-prefix (SC-CP) demodulation for each of the carriers.

Receiver 400 comprises an antenna 410 for receiving an incoming radio signal, an analog input stage 420 and a plurality of N parallel digital processing paths 430 coupled to the output of input stage 420, a carrier de-mapping block 440 coupled to the output each of the N parallel processing paths and a decoder block 450 outputting a stream of information bits 460, which ideally are those as input to a corresponding transmitter.

The signal as received by antenna 410, i.e. the receive signal, is passed from antenna 410 to the analog input stage 420, which amplifies the receive signal typically by using a low noise amplifier (LNA), and down-converts the amplified receive signal to a frequency suitable as input to a digital-to-analog converter comprised in stage 420. Then the amplified and down-converted receive signal is analogue-to-digital converted thus yielding a digitized receive signal y(k').

Here, the digitized receive signal y(k') is given by the discrete convolution of the transmitted signal (Tx-signal) x(k') with the channel impulse response h(k'), corrupted by zero mean additive white Gaussian noise (AWGN) n(k') with variance $\sigma_n^2$:

$$y(k')=x(k')*h(k')+n(k'), \quad (3)$$

The signal to noise ratio (SNR) γ can be defined as:

$$\gamma = \frac{E\{|x(k')*h(k')|^2\}}{\sigma_n^2}.$$

The receive signal is then coupled to n of the N parallel digital processing paths 430, wherein n is the number of used carrier frequencies. Since all of the N parallel digital processing paths 430 comprise the same functionality, the following description relates to each. In each of the n paths the receive signal is mixed to an individual carrier frequency $f_n$, individually in each of the n used parallel branches by deploying a complex multiplication in multiplier 431.

Each down-converted digital receive signal is filtered subsequently by a filter 432$_n$, thus yielding the signal z(n,k'), which can be expressed mathematically as the convolution of the received down-converted signal y(k')$e^{j2\pi k f_n}$ with receive filter function $g_{Rx}$(n,k'):

$$z(n,k')=(y(k')e^{j2\pi k f_n})*g_{Rx}(n,k') \quad (4)$$

Here the receive filtering (Rx-filtering) is used to cancel out the undesired adjacent channel interference. A high selectivity, i.e. steep filter edges, will provide low inter channel interference (ICI) and therefore a higher signal to noise ratio (SNR). However, sharp filter edges typically require high filter orders, which in turn have to be compensated for by an appropriate cyclic prefix length which in turn decreases the system's spectral efficiency. After digital Rx-filtering, the signal is down-sampled using processing block 433$_n$ turning the sample index k' back into the symbol index k.

In processing block 434$_n$ the cyclic prefix is removed and the signal z(n,k') is transformed into the time domain using FFT processing block 435$_n$ in order to yield the frequency bins Z(n,l) of the n-th carrier signal. The signal model can now be written as:

$$Z(n,l)=S(n,l)H(n,l)+W(n,l), \quad (5)$$

where S(n,l) is the FFT transformed version of the data signal s(n,k) and W(n,l) is the l-th frequency bin of the receive (Rx-) filtered noise and interchannel interference (ICI). The channel transfer function H(n,l) denotes the FFT transformed effective channel, consisting of the transmit (Tx-) filter, the receive (Rx-) filter and the transmission channel:

$$H(n,l)=\text{FFT}\{g_{Tx}(k)*h(k)*g_{Rx}(k)\} \quad (6)$$

Equalization can now be achieved in processing block 436$_n$ e.g. by zero-forcing the operation $$\hat{S}(n,l)=Z(n,l)/H(n,l) \quad (7)$$

where the equalized data signal ŝ(n,k) is obtained from subsequent IFFT block 437$_n$. Subsequently all equalized data signals are fed into processing block 440 for de-mapping the symbols from the n carriers, thus producing a stream of digital symbols, which ideally reflect the stream of digital symbols as output by processing block 230 in the transmitter. Lastly, the stream of digital symbols as output by de-mapper block 440 is fed into the detector/decoder stage 450, which outputs a stream of bits 460.

In the following the bit error rate (BER) performance of the proposed system is compared with the corresponding bit error rate of an OFDM system. The aim of this evaluation is to show the impact of the non-orthogonal GFDM carriers which can be controlled by the selectivity of the Tx and Rx digital system filters. The channel properties in the frequency domain, i.e. $FFT\{g_{Tx}(k)*h(k)*g_{Rx}(k)\}$, is assumed to be perfectly known at the receiver where we consider an AWGN environment. This means that the channel impulse response $h(k')$ only consists of one tap which is always set to $h(0)=1$.

For allowing a reasonable comparison between the systems, both the OFDM and the GFDM system are designed to have the same spectral efficiency, i.e., both system parameter sets are defined according to Table I.

TABLE I

SYSTEM PARAMETER SETS FOR GFDM AND OFDM

| Parameter | OFDM | GFDM |
|---|---|---|
| Signal Bandwidth | 20 MHz | 20 MHz |
| Number of carriers | 64 | 4 |
| Carrier bandwidth | 312.5 kHz | 5 MHz |
| Symbol duration | 3.2 µs | 0.2 µs |
| CP overhead | 25% | 25% |
| CP length | 16 Samples | Variable |
| Pulse Shape | rectangular | FIR: Cos-roll r = 0.1 |

In our numerical example, we use a cyclic prefix (CP) overhead of 25% for both the GFDM and the OFDM system. OFDM inherently exhibits this overhead due to the cyclic prefix in each OFDM symbol. In contrast to that, in the GFDM system the cyclic prefix depends on the length of the receive (Rx-) filter, where the length of the mobile channel can be neglected due to the AWGN assumption. Assuming a cyclic prefix overhead of 25% and a receive filter order of 25 symbols, the GFDM FFT block length is 100 symbols. Hence, the GFDM FFT is 6.25 times longer than in the OFDM system.

Figure 5:
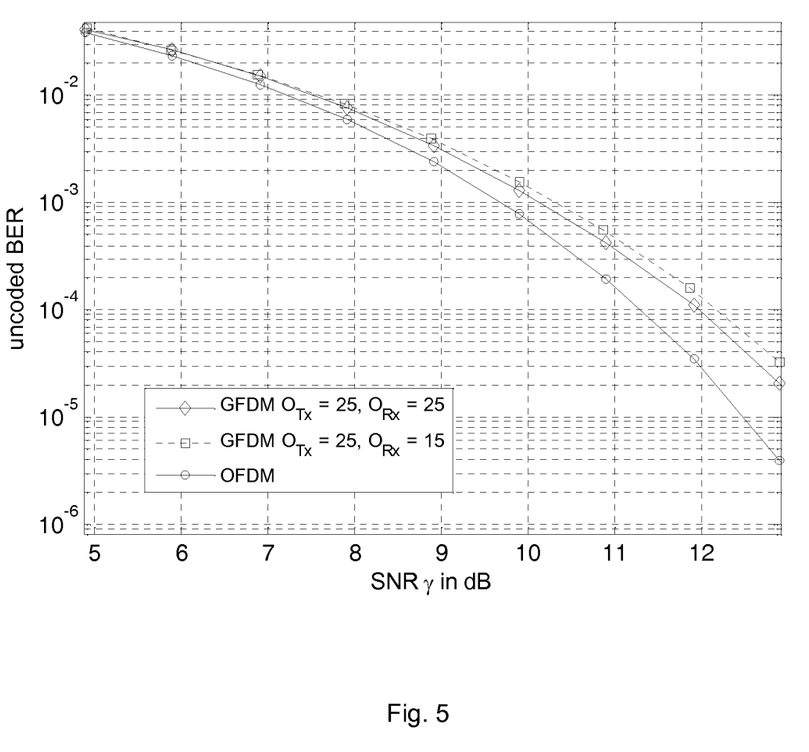
FIG. 5 shows a graph of bit error rate performance for QPSK modulation, assuming a AWGN channel.

FIG. 5 depicts the bit error rate of uncoded QPSK modulated symbols for both OFDM and GFDM, where GFDM uses different filter orders for transmit (Tx) and receive (Rx) filtering. The orders of the digital Tx and Rx cosine roll-off filters are denoted by $O_{Tx}$ and $O_{Rx}$, respectively.

Figure 6:
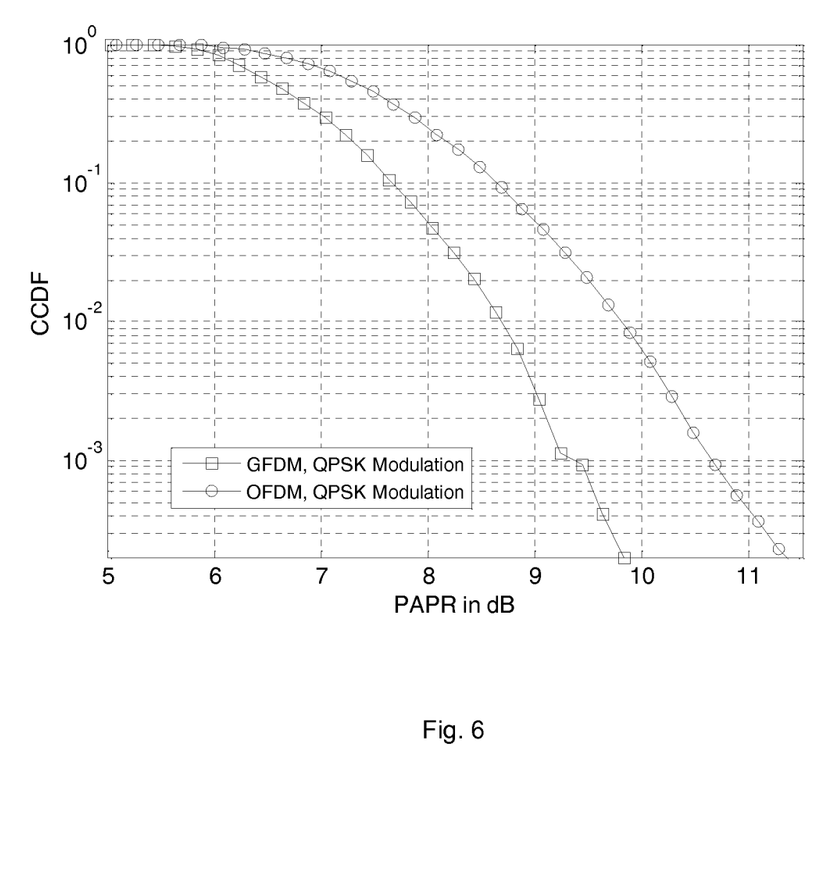
FIG. 6 shows a graph of the peak-to-average power ratio both for OFDM and the GFDM concept according to the invention.

FIG. 6 shows a comparison of the peak-to-average power ratio (PAPR) for OFDM and GFDM. Due to fewer carriers, GFDM exhibits a superior peak-to-average power ratio (PAPR) performance compared to conventional OFDM signaling.

It has thus been presented a multi-carrier system architecture based on digitally implemented filter banks. In an ex-post facto consideration the inventive transmitter implementation reveals an allusion to a classical filter bank approach of the late 1950ies having multiple branches for multiple carriers (which has not been pursued due to the exhausting requirements on the analog components), but which is now implemented digitally. It has been shown that our novel GFDM approach significantly reduces the requirements set on the analogue front-end. In particular, GFDM combines both the advantages of a specific carrier allocation and a low PAPR. Low PAPR allows to reduce the hardware cost and power consumption, which is an important point of sale for future wireless systems. Furthermore, as each single carrier can be modulated individually, that provides a high degree of flexibility in the system design, e.g. multi-user scheduling. It has been shown that, in comparison to conventional multi-carrier systems, GFDM is an efficient alternative for heavily fragmented spectrums.

The invention claimed is:

1. A transmitter for data transmission by a frequency division multiplexing (FDM) method, comprising:
the transmitter being adapted and configured to:
detect vacant frequency ranges in a plurality of allocated frequency ranges of a transmission frequency band,
define a single center frequency for each of said detected vacant frequency ranges as a divisional multiplex carrier frequency, and
transmit information about said detected vacant frequency ranges and defined center frequencies to a receiver through an established communication channel,
said transmitter further comprising:
digital means for channel encoding an incoming stream of bits and for mapping the channel encoded bits to symbols, wherein the mapping is individual per carrier frequency;
digital mapping means for mapping said symbols to the defined carrier frequencies;
a plurality of parallel processing branches coupled to said digital mapping means, each branch comprising means for adding a cyclic prefix to a symbol, means for digital pulse shaping a symbol, wherein the pulse shaping is individual per carrier frequency, thus producing non-orthogonal carriers, and a complex multiplier for shifting a symbol to carrier frequencies;
a complex adder for adding symbols processed by said plurality of parallel branches thus producing a single digital transmit signal; and
means for digital-to-analogue converting, upconverting and amplifying the single transmit signal for transmission.

2. The transmitter arrangement of claim 1, wherein each of the plurality of parallel processing paths comprises means for performing a tail biting technique to shorten the cyclic prefix of a symbol.

3. The transmitter of claim 1, wherein said pulse shaping means is adapted and configured to minimize mutual interference between said frequency divisional multiplexing carriers.

4. A receiver for receiving a plurality of non-orthogonal frequency divisional multiplexed radio signals, comprising:
the receiver being adapted and configured to receive information from a transmitter through an established communication link about vacant frequency ranges in a plurality of allocated frequency ranges detected by the transmitter and a single center frequency for each of said detected vacant frequency ranges as a divisional multiplex carrier frequency defined by said transmitter, said receiver further comprising:
an analogue input stage for amplifying and down converting a received signal and for analogue-to-digital converting said received signal;
a plurality of parallel digital processing paths, each coupled to said analogue input stage and each adapted and configured for digitally down-converting the received signal to an individual carrier frequency and for outputting transmit symbols mapped to said individual carrier frequency;
a carrier de-mapping means coupled to each of the plurality of parallel processing paths for individually de-mapping symbols from carrier frequencies; and
a detector/decoder means coupled to said carrier de-mapping means for decoding bits from the symbols.

5. The receiver of claim 4, wherein each of the parallel digital processing paths comprises:
- a complex multiplier for mixing the received signal to an individual carrier frequency;
- a pulse shaping means for removing inter channel interference; and
- means for removing a cyclic prefix of symbol.

6. The receiver of claim 5, wherein each of the parallel digital processing paths further comprises a Fast Fourier Transformation (FFT) processing block followed by an equalization processing block followed by an inverse Fast Fourier Transformation Block.

\* \* \* \* \*